United States Patent [19]

Leeper et al.

[11] Patent Number: 4,755,096
[45] Date of Patent: * Jul. 5, 1988

[54] APPARATUS FOR MOVING STRIPS USING MECHANICAL MANIPULATOR

[75] Inventors: Lloyd C. Leeper, Harrisburg; C. Thomas Mullen, Hummelstown, both of Pa.

[73] Assignee: Hershey Foods Corporation, Hershey, Pa.

[*] Notice: The portion of the term of this patent subsequent to Apr. 14, 2004 has been disclaimed.

[21] Appl. No.: 914,246

[22] Filed: Oct. 2, 1986

Related U.S. Application Data

[63] Continuation-in-part of Ser. No. 723,085, Apr. 15, 1985, Pat. No. 4,657,466.

[51] Int. Cl.4 ............................................. B65G 65/00
[52] U.S. Cl. ................................. 414/416; 198/468.2; 271/69; 271/308; 271/312; 294/103.1; 414/741; 414/751; 901/7; 901/16; 901/22; 901/39
[58] Field of Search ............... 414/416, 739, 741, 751; 901/7, 16, 22, 39; 294/88, 67.22, 103.1; 198/468.2; 271/69, 70, 84, 198, 308, 312

[56] References Cited

U.S. PATENT DOCUMENTS

| | | | |
|---|---|---|---|
| 3,865,421 | 2/1975 | Pfeifer | 294/67.22 |
| 3,884,363 | 5/1975 | Ajlouny | 414/751 X |
| 3,938,847 | 2/1976 | Peyton | 414/416 X |
| 3,995,757 | 12/1976 | Runyan et al. | 414/416 |
| 4,005,782 | 2/1977 | Crockett | 901/22 X |
| 4,030,746 | 6/1977 | Langowski | 294/88 |
| 4,056,188 | 11/1977 | MacFarlane et al. | 901/39 X |
| 4,266,819 | 5/1981 | Pemberton | 294/88 |
| 4,293,272 | 10/1981 | Jellema | 414/416 |
| 4,302,142 | 11/1981 | Kuhl et al. | 414/416 X |
| 4,364,555 | 12/1982 | Wise | 271/308 |
| 4,482,289 | 11/1984 | Inaba et al. | 901/39 X |
| 4,493,604 | 1/1985 | Walker | 294/67.22 X |
| 4,504,186 | 3/1985 | Richards | 198/468.2 X |
| 4,597,707 | 7/1986 | Cornacchia | 901/16 X |
| 4,604,021 | 8/1986 | Werner | 901/22 X |
| 4,657,466 | 4/1987 | Leeper et al. | 414/416 |

FOREIGN PATENT DOCUMENTS

2120202 11/1983 United Kingdom ............... 901/16

Primary Examiner—Robert J. Spar
Assistant Examiner—David A. Bucci
Attorney, Agent, or Firm—Paul & Paul

[57] ABSTRACT

In the commercial production of licorice bites, each about 1 inch long, a group of extruded 54-inch licorice strips are lifted by a programmable controlled robot from the discharge end of a lower conveyor and deposited at the input end of an upper conveyor which carries the strips to a cutting station. The robot hand has a lower stainless steel blade for insertion under the group of licorice strips to wedge the sticky strips from a board on which they are being carried by the lower conveyor. The robot hand includes an upper bar. The bar is moved relative to the blade after insertion of the blade under the licorice strips, thereby clamping the strips between the bar and the blade. The arm of the robot then lifts the hand and clamped group of licorice strips and deposits the front ends of the strips at the input of the upper conveyor.

11 Claims, 8 Drawing Sheets

APPARATUS FOR MOVING STRIPS USING MECHANICAL MANIPULATOR

CROSS-REFERENCE TO RELATED APPLICATION

This is a continuation-in-part of application Ser. No. 723,085, filed Apr. 15, 1985, now U.S. Pat. No. 4,657,466.

BACKGROUND OF THE INVENTION

This invention relates to the commercial production of materials such as candies, from strips of material, including but not limited to tacky materials such as licorice, and more specifically to the production of licorice bites.

In the commercial production of licorice, the licorice mix is extruded through orifices to form strips. In a typical case, a group, for example, of fifteen or sixteen strips of licorice each, for example, 54 inches long, are extruded and deposited in parallel manner directly onto a rectangular board for transport, as by a conveyor, through a dryer and then to a further position at which the strips of licorice are lifted from the board and raised to the level of a second conveyor which carries the 54 inch strips to a cutter position at which the strips are severed into "bite" length, for example, one inch.

Licorice strips are made from a mix which includes among its ingredients flour, water, sugar and flavoring. Due largely to the presence in the mix of a substantial quantity of sugar, as the extruded licorice strips pass through the dryer they become tacky and tend to stick to the board on which they are being transported.

In the prior art, the sticky strips of licorice are lifted manually from the board as by the hand of an operator, and are placed and accumulated on a table referred to as a cutting or accumulation table. Strips are then picked up in small quantity groups (one, two or three) and are then manually fed through the cutter.

SUMMARY OF THE PRESENT INVENTION

A principal object of the present invention is to reduce the cost of production of candies or other items made from strips by providing automatic equipment for lifting a group of extruded strips, such as from a transport board on a first conveyor onto a second conveyor.

The foregoing object is accomplished, in accordance with the present invention, by providing an automatically controlled mechanical manipulator or robot to lift the extruded, preferably tacky strips from the transport boards onto the second conveyor.

DETAILED DESCRIPTION OF THE PREFERRED EMBODIMENTS

In accordance with the present invention, a commercially available mechanical manipulator or robot 10 is equipped with a specially designed "hand" 20 for lifting a group of licorice strips from a board onto which the strips were extruded and carried through a dryer by a conveyor. The group may, for example, comprise fifteen or sixteen strips each 54 inches long, disposed on the board in parallel relation. The strips are tacky and tend to stick to the board.

Figures 1, 1A:
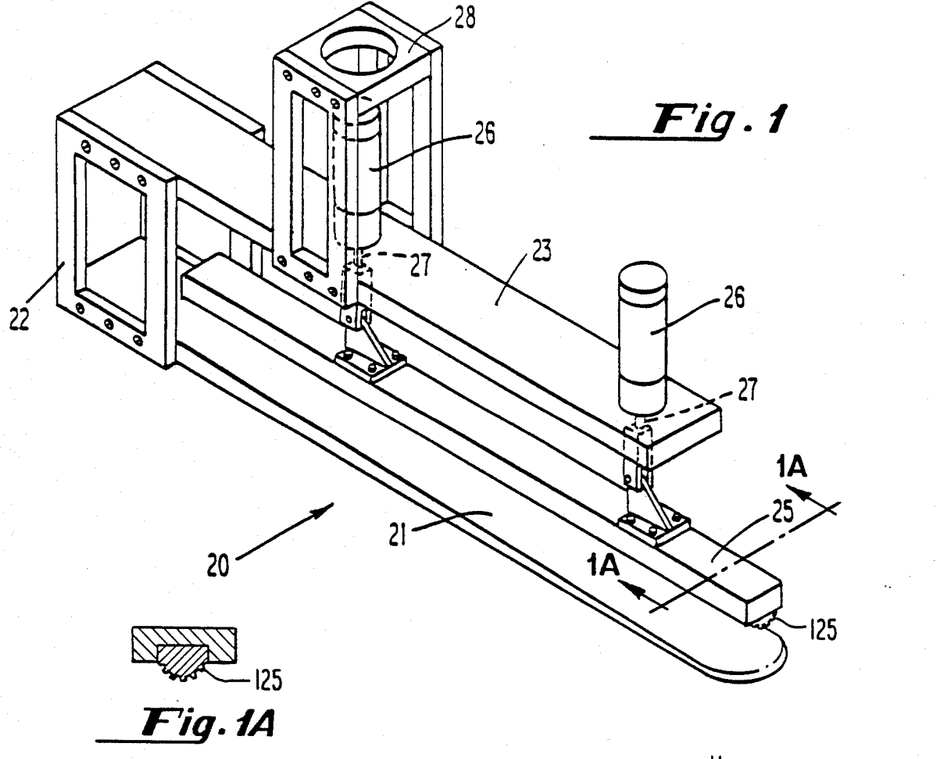
FIG. 1 is a perspective view of a "hand" of the mechanical manipulator or robot.
FIG. 1A is a cross-sectional view taken through the clamping bar of the robot hand of FIG. 1, generally along the line 1A—1A of FIG. 1.

The robot hand 20, illustrated in FIG. 1, comprises a frame 22 which supports a lower blade 21 which projects forwardly therefrom. Blade 21 has a tapered front edge and functions as a spatula. It is preferably made of stainless steel. Hand frame 22 also supports a forwardly-extending upper support bar 23 which in turn supports a vertical frame member 28 which is designed to be attached to the wrist 15 of the robot 10. Upper support bar 23 also supports a pair of vertically oriented air cylinders 26 the pistons 27 of which are attached to a clamping bar 25 positioned above the lower blade 21 in coaxial alignment therewith. Secured to the undersurface of bar 25 is a parallel "fluted" stainless steel insert, 125, as shown in FIG. 1A. Bar 25 and its fluted undersurface 125 are narrower than lower blade 21. For example, blade 21 may be 2 inches wide and bar 25 and its fluted undersurface may be 1 inch wide.

The mechanical manipulator or robot 10 is a commercially available item. It may, for example, be an ASEA industrial robot and may be obtained, along with the programmable controller, from ASEA Robotics, Inc., 16250 West Glendale Drive, New Berlin, Wis.

Figure 2:
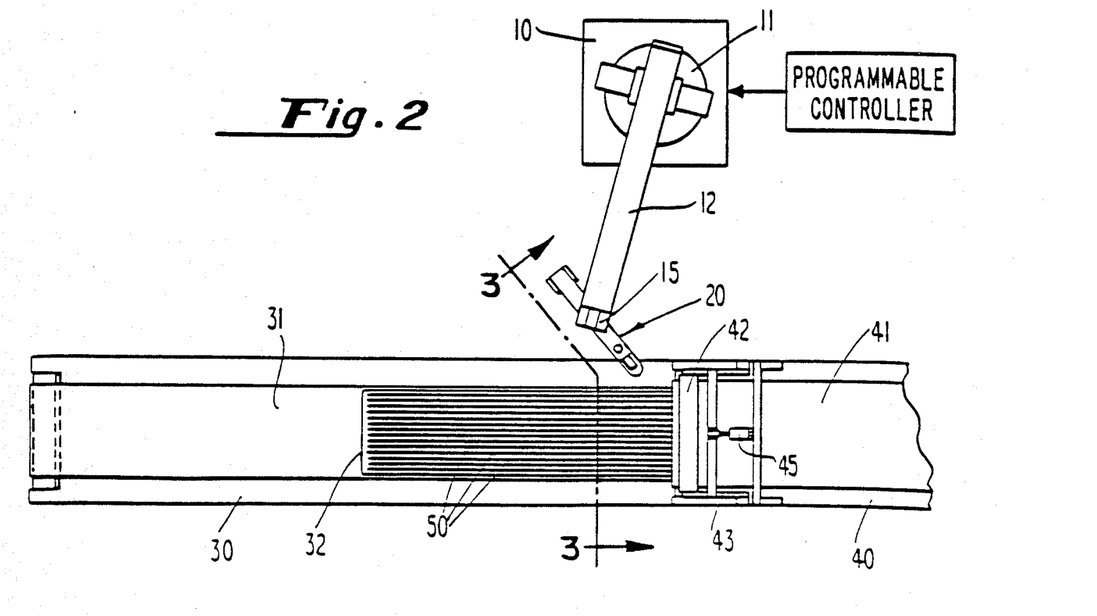
FIG. 2 is a top plan view illustrating diagrammatically one embodiment of a robot and the hand of the robot before it is inserted into position to lift a group of parallel licorice strips.

As illustrated in FIG. 2, robot 10 is controlled by a Programmable Controller housed in a control cabinet located near the robot. The body 11 of the robot 10 has rotary movement, arm 12 has both radial and vertical movement, and wrist 15 has rotary, bending and sweep movement. The robot also has horizontal travel.

In FIG. 2 of the drawing, the hand 20 of the robot is shown in a position to one side of a conveyor 31 which is transporting a group of licorice strips 50 on a board 32 to a lifting station at which the group of licorice strips are to be lifted from board 32 and placed on an upper second conveyor 41 for transport to a cutting station. Conveyors 31 and 41 are supported on frames 30 and 40, respectively.

Figure 3:
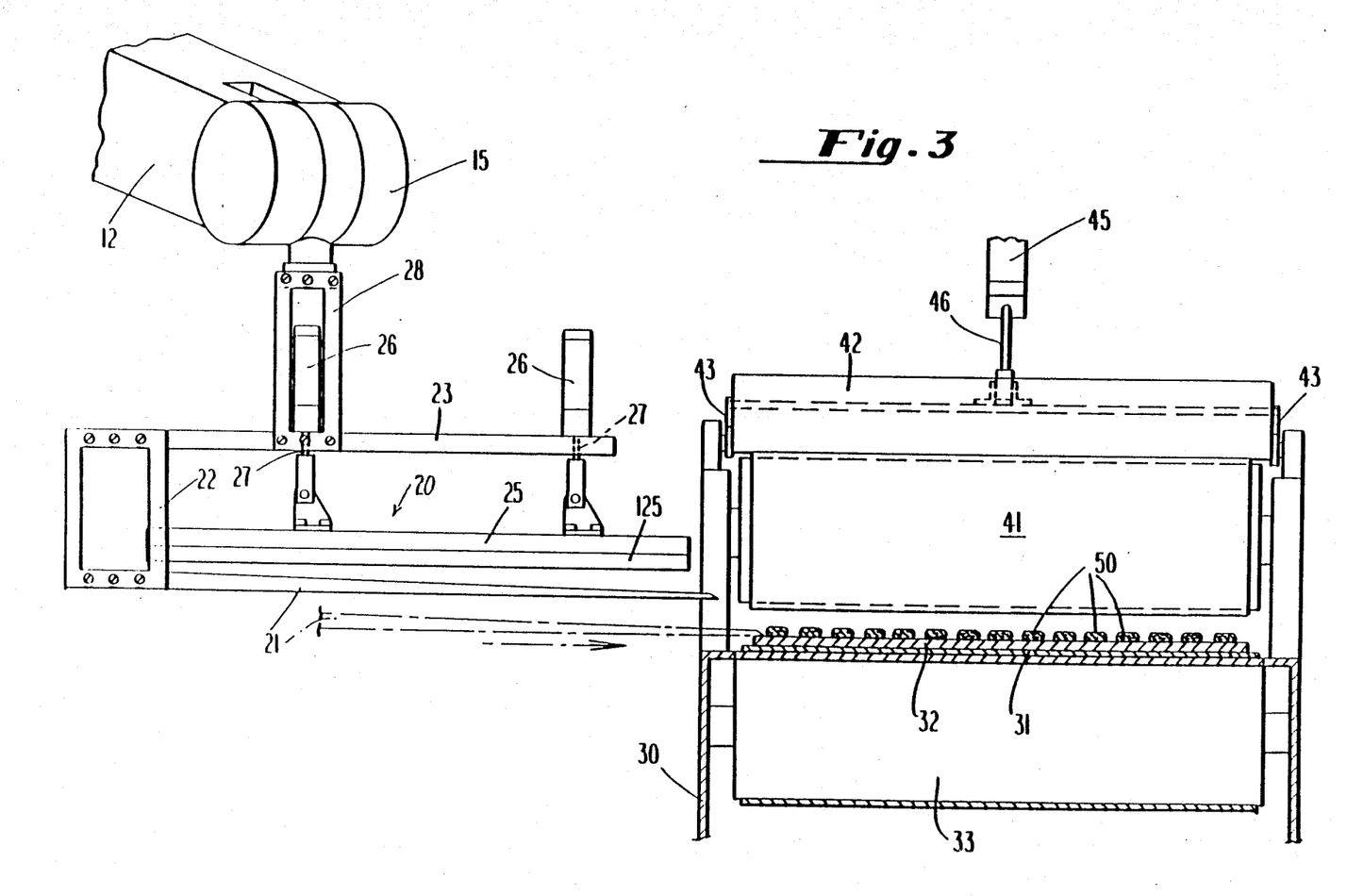
FIG. 3 is a view looking along the line 3—3 of FIG. 2 showing in side elevation the robot hand and showing in end elevation a conveyor which transports a plurality of licorice strips on a board to a lifting position.

FIG. 3 is a view taken along the line 3—3 of FIG. 2, and shows the robot hand 20 in side elevation in the position which it occupies prior to being moved forwardly, by radial movement of robot arm 12, into a position in which the lower blade 21 is inserted under the plurality of licorice strips 50. In FIG. 3, the group of licorice strips 50 are shown resting on a board 32 which is being transported by the conveyor belt 31. Also seen in Fig. 3 is an upper conveyor 41, a pressure roller 42, an air cylinder 45 and a piston 46 by means of which pressure roller 42 is raised and lowered relative to upper conveyor 41.

Figure 4:
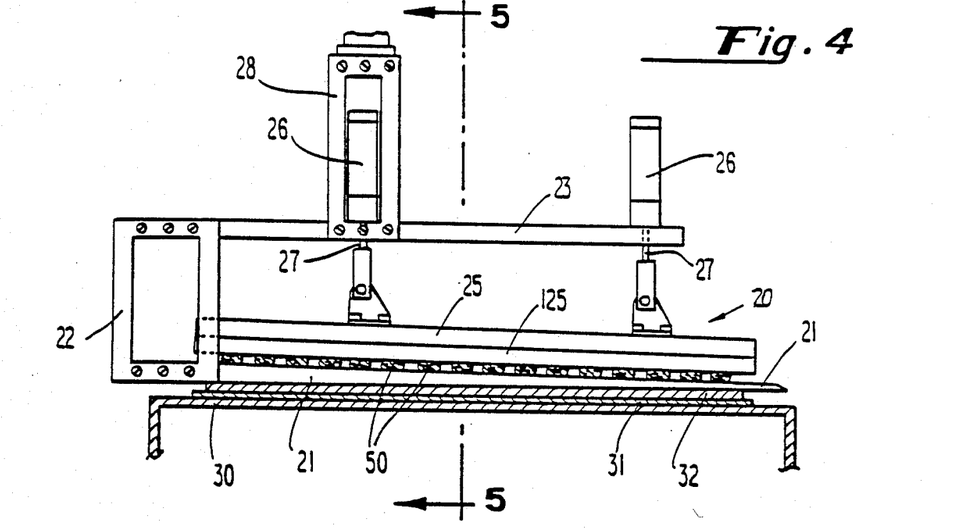
FIG. 4 is an elevational view showing the robot hand of FIG. 1 after it has been moved forwardly to a position in which it lifts the licorice strips from the board.

In FIG. 4, the robot arm 12 (see FIG. 2) has been moved radially counterclockwise, as viewed in FIG. 2, and hand 20 has been moved forwardly in such manner that lower blade 21 had wedged itself under the group of sticky licorice strips, thereby separating the licorice strips 50 from board 32. Following full insertion of blade 21 under the group of licorice strips 50, the upper arm 25 is lowered, by actuation of air cylinders 26, thereby causing the fluted stainless steel insert 125 to press against the licorice strips. The entire group of licorice strips are now clamped, and gripped for lifting.

Figure 5:
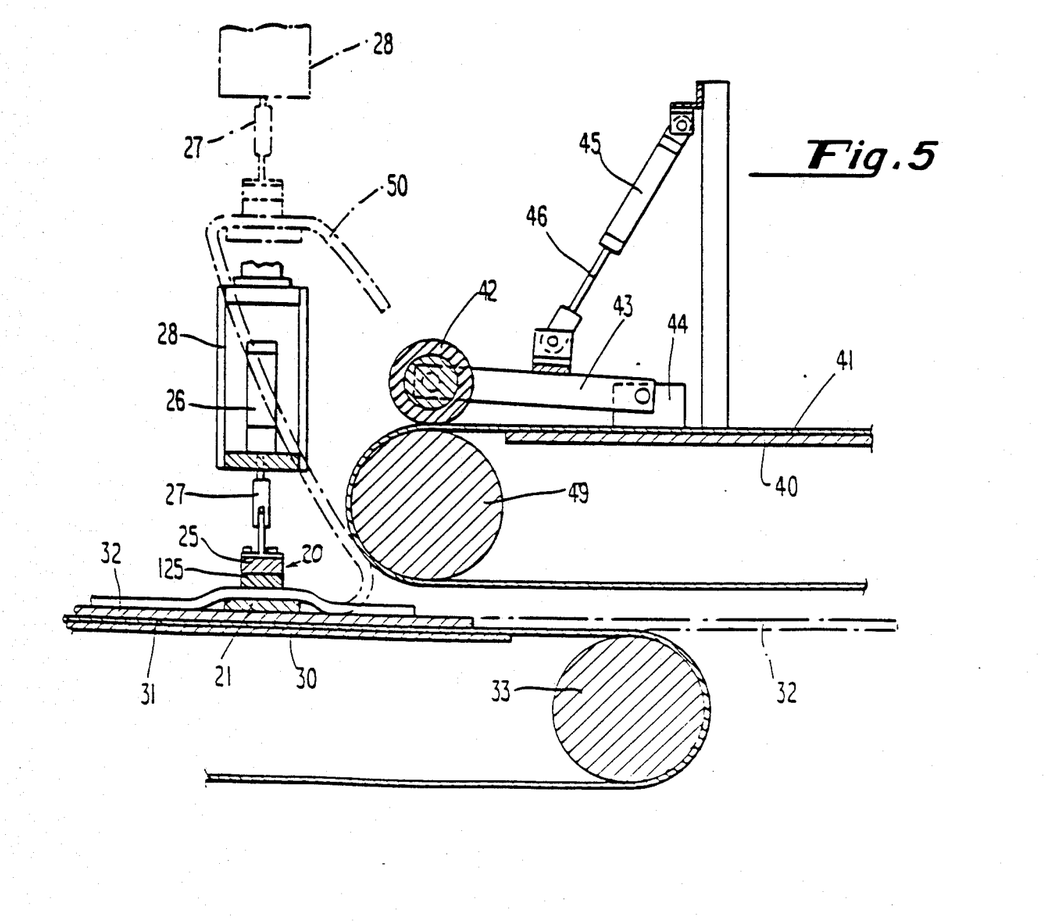
FIG. 5 is a side elevational view looking along the line 5—5 of FIG. 4 showing, in phantom, the robot hand lifting the forward ends of the group of licorice strips to a position above and in front of a second conveyor.

In FIG. 5, arm 12 of robot 10 (FIG. 2) has been raised vertically, thereby lifting the robot hand 20 vertically from the solid line position shown in FIG. 5 to the phantom position. This lifts the forward end of the group of licorice strips 50 to the position shown in phantom in FIG. 5. During this lifting action, the group of licorice strips 50 remain clamped between the lower blade 21 and the fluted stainless steel insert 125 (optionally included or not) of the upper bar 25. Also, during this lifting action, conveyor 31 continues to move forwardly and as it does so the strips of licorice are peeled away from the board 32.

Figure 6:
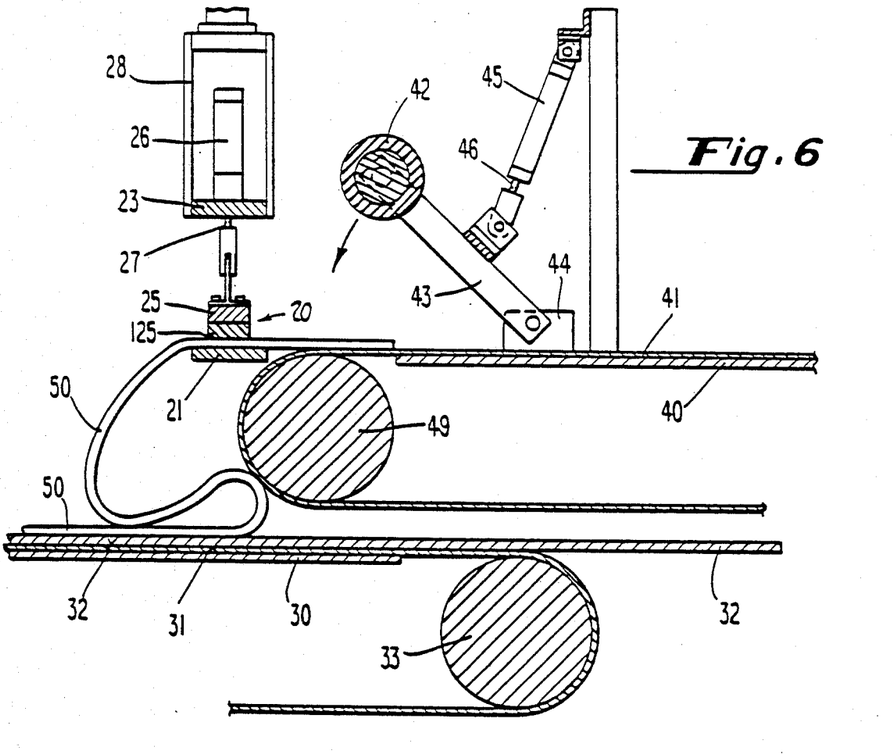
FIG. 6 is a view similar to that of FIG. 5 but showing the robot hand having lowered the licorice strips to a position such that the front portions of the licorice strips now rest on the second conveyor.

Immediately following the situation illustrated in FIG. 5, air cylinder 45 is actuated, thereby retracting piston 46 and pulling arm 43 pivotally upwardly about pivot block 44. This raises pressure roller 42 to a position illustrated in FIG. 6. With pressure roller 42 in raised position, robot arm 12 is now lowered, thereby lowering hand 20 to a position illustrated in FIG. 6 in which the forward ends of the group of licorice strips 50 rest on upper conveyor 41. At this time, upper conveyor 41 is preferably stopped. This avoids stretching of the still sticky licorice strips while they are still clamped by hand 20 of robot 10. During the action just described, lower conveyor 31 has continued to move forwardly and licorice strips 50 have continued to be peeled from board 32.

Figure 7:
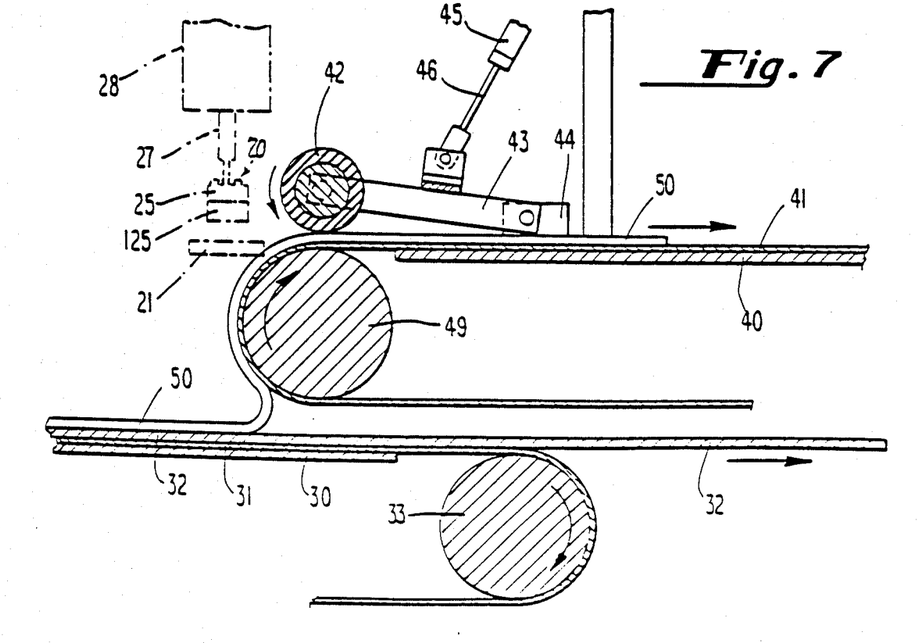
FIG. 7 is a view similar to that of FIG. 6 but illustrating, in phantom, the robot hand withdrawn from a position across the conveyor and in a position similar to that shown in FIG. 2.

In FIG. 7, the upper clamping bar 25 and fluted stainless steel insert 125 have been raised relative to lower blade 21, thereby releasing the grip on licorice strips 50. With the grip now released, arm 12 of the robot 10 (FIG. 2) is moved radially clockwise to withdraw hand 20 from its position across conveyor 31 and to return it to a position shown in FIGS. 2 and 3. The group of licorice strips 50 are now carried forwardly on the upper or second conveyor 41 and the ends of the licorice strips are peeled from board 32 which continues to move forwardly on the lower conveyor 31.

Figure 8:
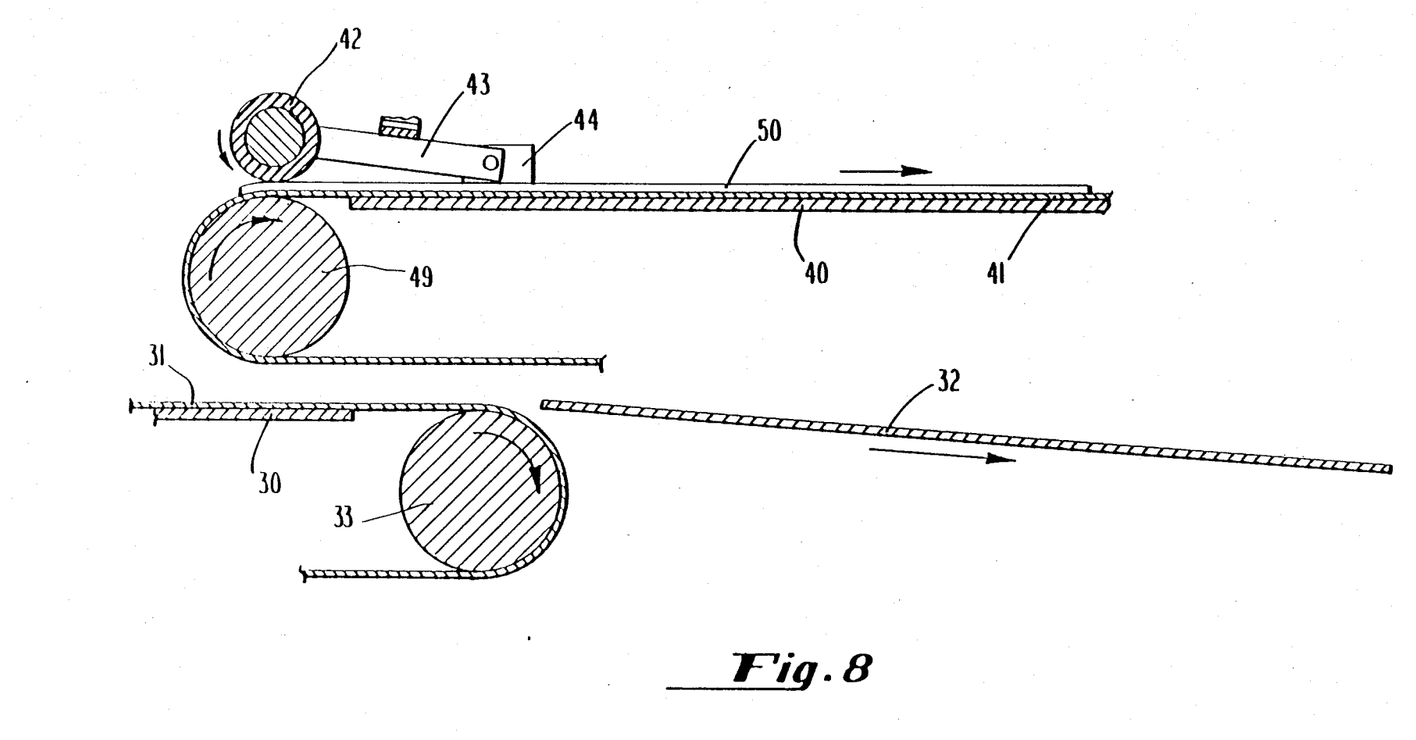
FIG. 8 is a view showing the group of licorice strips being conveyed by the second conveyor toward a cutter (not shown) at which the strips of licorice are reduced to bite size.

In FIG. 8, the group of licorice strips 50 is shown being carried on upper conveyor 41 toward a cutting mechanism, not shown, which reduces the licorice strips to bite size, and board 32 is shown being discharged through a space between lower conveyor 31 and upper conveyor 41. The cutting mechanism, which is referred to above but not shown, may preferably be of the type shown, described and claimed in our copending patent application entitled "Cutter and Ejector for Use in Manufacture of Licorice Bites", now U.S. Pat. No. 4,598,619, assigned to the assignee of the present application.

In the drawings, lower conveyor 31 is illustrated as being driven by drive roller 33 while upper conveyor 41 is illustrated as driven by drive roller 49.

With particular reference now to the preferred commercial embodiment illustrated in FIGS. 9 through 12, there is disclosed the first, or lower conveyor 200 and the second or higher conveyor 201, for delivery of strips 202 from boards 203 from the lower conveyor 200 to the upper conveyor 201.

Figure 9:
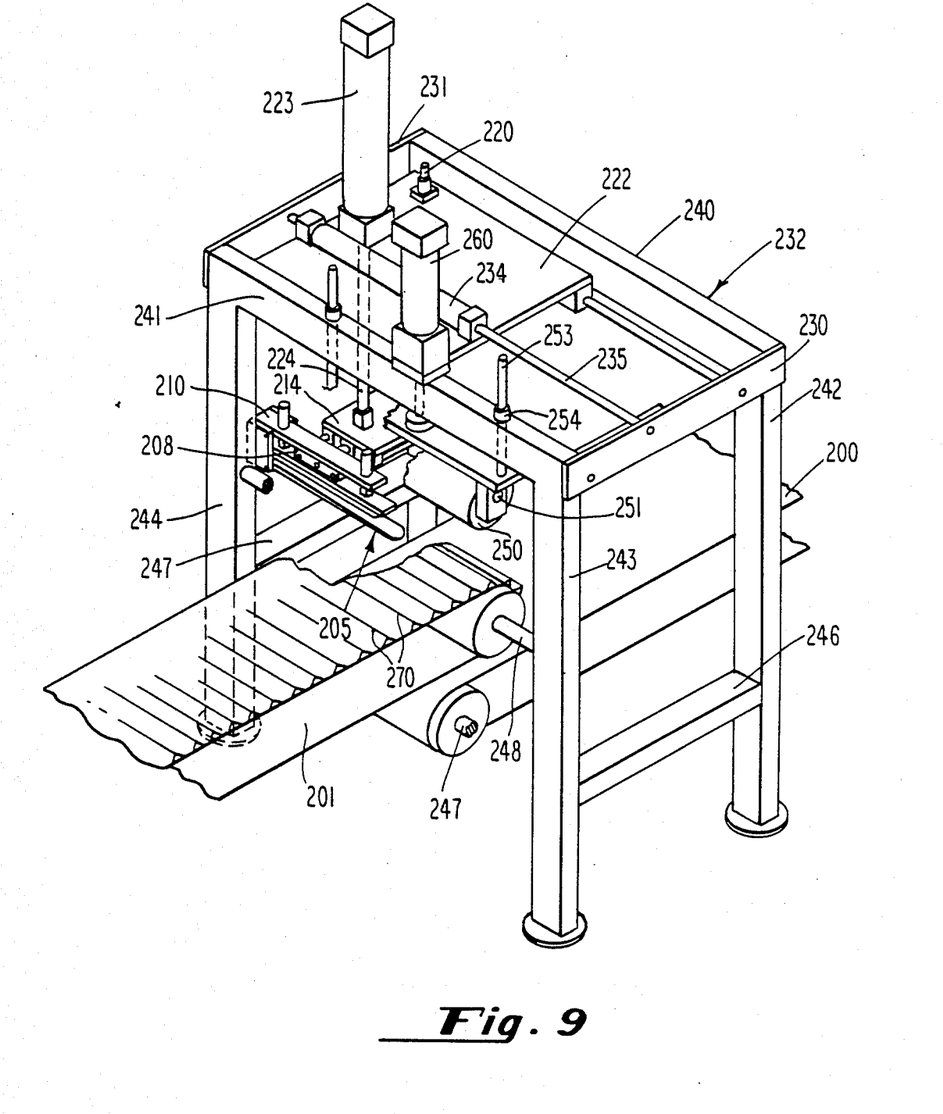
FIG. 9 is a perspective view of a preferred commercial embodiment of the robot of this invention, with portions broken away for the sake of clarity.

The hand 205 is generally constructed similar to that 20 illustrated in the embodiment of FIG. 1, so the details of construction thereof will not be repeated herein, except to the extent that there are differences. It will be noted that the hand 205 has its clamping bar cylinders 206 and 207 more widely spaced than in the earlier embodiment, and that it is sidewardly mounted by means of a mounting plate 208 carried from upper frame member 210, with guide posts 211 and 212 carried between the plate 208 and bushings 213 that, in turn, are carried by a vertically movable plate 214.

A drive cylinder, of preferably the pneumatic type 215 is also carried by the plate 214, and has its drive rod 216 connected for drivingly moving the plate 208 and consequently the hand 205 in a horizontal direction, generally longitudinal of the movement of strips along upper runs of conveyors 200 and 201. It will be understood that the cylinder 215 is preferably of the double-acting type for movement of the hand in both forward and return directions, depending upon the direction of actuation of the cylinder.

Figure 11:
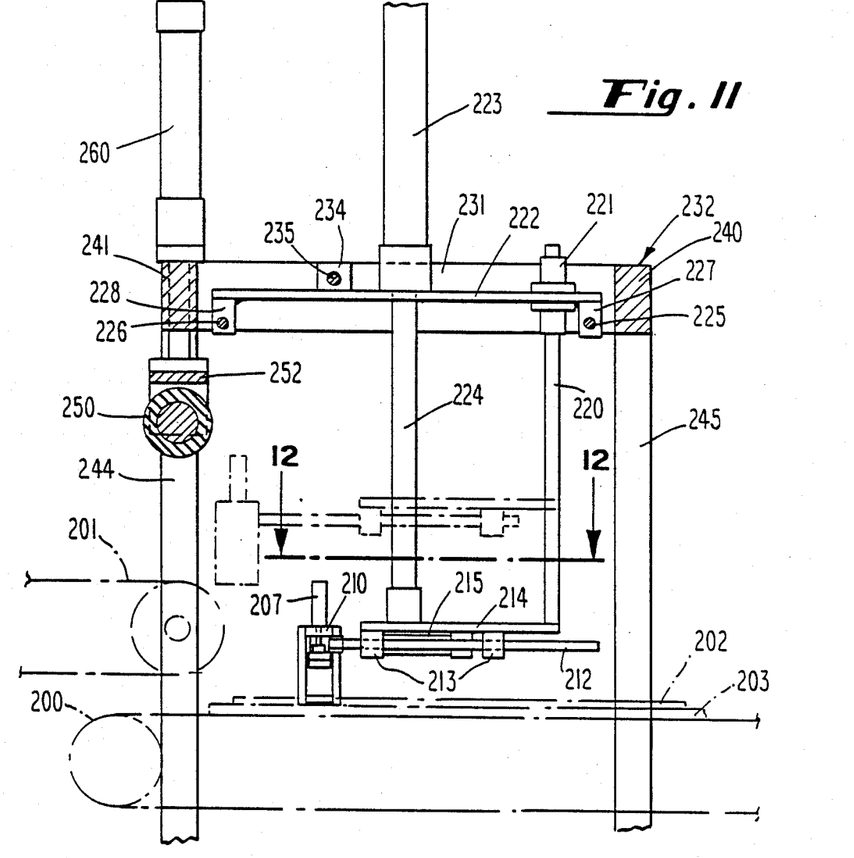
FIG. 11 is a longitudinal sectional view taken through the robot of FIG. 10, generally along the line 11—11 of FIG. 10.
Figure 12:
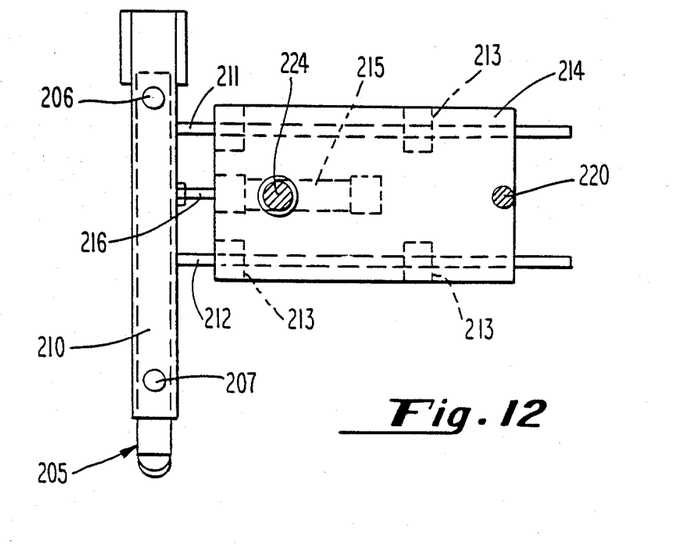
FIG. 12 is a plan view of a portion of the robot of FIG. 11, taken generally along the line 12—12 of FIG. 11.

The plate 214 is provided with a suitable guide rod means 220 carried between the plate 214 and a vertically disposed guide bushing 221, that, in turn is carried by a frame-mounted, generally horizontally disposed traversing plate 222. The drive cylinder 223 for raising and lowering the plate 214 is carried by the plate 222, as is best illustrated in FIGS. 9 and 11, connected to the plate 214 via a drive rod or arm 224. The cylinder 223 is also preferably of the double-acting pneumatic type.

The traversing plate 222 is carried for guiding movement along generally horizontally disposed guide rods 225 and 226, connected to the plate 222 by suitable means, such as through depending ball bushings or any other suitable slide means 227, 228, that, in turn, are carried beneath the plate 222. The guide rods 225 and 226 are mounted at their ends in suitable end plates 230 and 231 of a main frame, generally designated by the numeral 232.

A preferably double-acting pneumatic drive cylinder 234 is carried on traversing plate 222, and has its drive rod 235, likewise connected between end plates 230 and 231, for providing the horizontal drive for moving the plate 222, and eventually the hand 205, in a traversing direction, transverse to the path of movement of strips along the conveyors 200 or 201.

It will thus be seen that drive means are provided for moving the hand 205 in three generally linear directions, each at right angles to the other.

Figure 10:
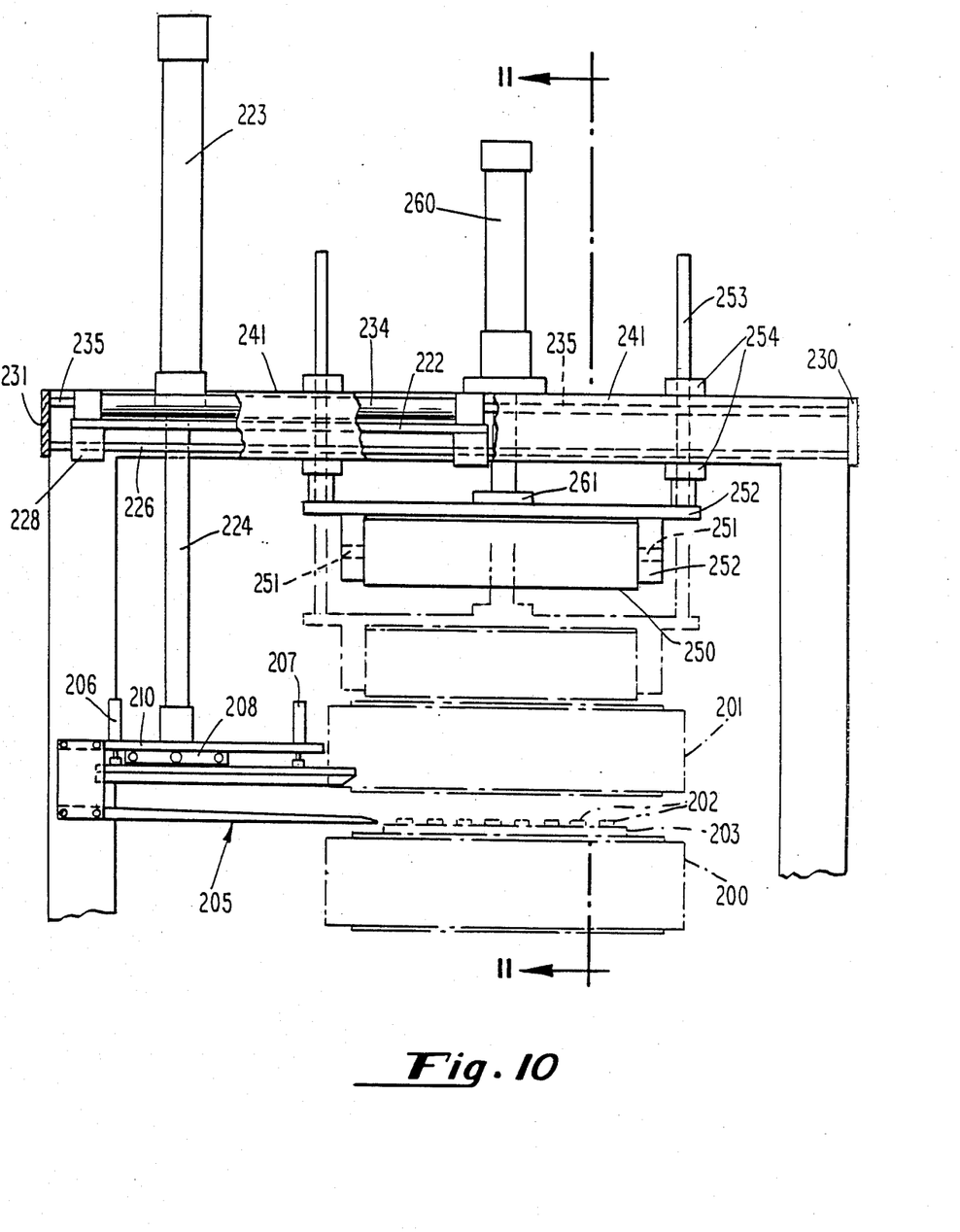
FIG. 10 is a fragmentary transverse elevational view of the robot of FIG. 9, with conveyor portions and holddown roller being illustrated in phantom for the sake of clarity.

It will be noted that the main frame 232 is provided with horizontal connecting members 240 and 241, connecting end plates 230 and 231, and has vertical legs 242, 243, 244 and 245, supporting the same, with suitable horizontal rigidifying supports as shown, with the legs straddling the two conveyors 200 and 201, as illustrated in FIGS. 9-11. If desired, the shafts 247 and 248 may be carried from legs of the main frame, as illustrated.

The support bar 241 of the main frame carries pressure roller 250 that is shaft-mounted at 251, in suitable bearing or other mounts, that in turn are carried by a roll mounting plate 252. The plate 252 is provided with generally vertically disposed guides in the form of guide rods 253 carried by the plate 252, and slidably received in bushings 254 that, in turn, are carried by horizontal main frame member 241, for guiding the movement of the pressure cylinder 250, as it moves downwardly toward, and then upwardly away from the upper run of second conveyor 201, as is best illustrated in the movement of the roller 250 between the full line and phantom positions therefor illustrated in FIG. 10.

The drive for moving the roller vertically is provided by a generally vertically disposed cylinder 260, carried on frame member 261, and connected to the plate 252, as at 261, for movement of the roller downwardly into contact against tacky strips 202 that are delivered to the second conveyor, to retain the same thereagainst, in much the same manner as is effected by the roller 42 in the embodiment of FIG. 7, except that the roller 250 is moved vertically downwardly, rather than through a pivotal motion as provided for the roller 42 of FIG. 7.

It will be noted that, because the strips comprise a tacky substance, each of the cylinders that are applicable for moving the hand 205 or roller 250, are able to exert sufficient force to separate the strips from the board, or to press the strips against a secondary conveyor upon withdrawal of the hand, in overcoming the tacky resistance to the extent necessary, as the case may be.

The roller 250 is completely round (smooth). The belt 201 however, is a sanitary "meat cleat" design as shown in FIG. 9, with cleats about every 1 inch. These cleats 270 dig into the bottom side of the licorice to provide traction. The licorice is not damaged and returns to its original shape.

It will be apparent from the foregoing that various materials other than licorice may be handled by the apparatus of the present invention, and that several variations may take place in the movement of the hand by the robot apparatus of this invention, including the commercial form of the robot with its threedirectional hand movement. Various modifications may be made in the details of construction and materials used, all within the spirit and scope of the invention as defined in the appended claims.

What is claimed is:

1. A programmably controllable robot apparatus positioned at a lifting station at which a group of tacky strips is to be lifted from a lower to an upper conveyor, said robot including an arm having a plurality of movements, means for moving the arm in a plurality of movements, in at least three directions at generally right angles to each other, lower and upper said conveyors, and a mechanical hand attached to said arm, said hand including:
   (a) a frame member;
   (b) a lower blade extending forwardly from a lower part of said frame member;
   (c) a support bar extending forwardly from an upper portion of said frame member;
   (d) a clamping bar positioned below said support bar and above said lower blade; and
   (e) means supported on at least one of said support bar and clamping bar and connected to the other of said support bar and said clamping bar for lowering and raising said clamping bar relative to said lower blade and including in said apparatus, means for engaging tacky strips moved from the lower conveyor to said upper conveyer and for maintaining the strips against said upper conveyor.

2. Apparatus according to claim 1, wherein the blade is of thinner vertical dimension at its outer extended portion and wherein the means for lowering comprises a plurality of pressure cylinders with associated pistons.

3. Apparatus for transferring strips from a carrier member, said apparatus including:
   (a) a first conveyor for transporting a carrier member and strips carried thereon along a path to a transfer station;
   (b) a second conveyor having an input end at said transfer station;
   (c) a mechanical hand at said transfer station, said hand including: a frame member, a spatula blade extending forwardly from said hand frame member, a clamping bar positioned relative to said blade and carried from said frame member, and means for effecting relative clamping and unclamping movement between said clamping bar and said blade;
   (d) means for moving said hand from a withdrawn position relative to the path of strips on a carrier member to an extended position relative thereto in which said blade wedges itself between said strips and the carrier member;
   (e) means for actuating said means for effecting clamping movement whereby the strips become clamped between said clamping bar and said blade;
   (f) means for moving said hand to deliver the forward ends of the strips to a resting position on the input end of said second conveyor;
   (g) means for maintaining the strips against the surface of said second conveyor;
   (h) means for actuating said means for effecting unclamping movement thereby to release the clamping by said hand of the strips; and
   (i) means for withdrawing the hand to a withdrawn position relative to said second conveyor.

4. The apparatus of claim 3, wherein said means for moving and withdrawing the hand comprises means providing movement for the hand in three directions of movement.

5. The apparatus of claim 4, wherein the second conveyor is at a different vertical elevation than the first conveyor, and wherein the means providing movement comprises:

(a) first means for moving the hand transversely of the path of movement of strips;

(b) second means for moving the hand vertically between conveyors to accommodate the different vertical elevations of the conveyors; and (c) third means for moving the hand longitudinally along the same general direction as the path of movement of strips along the conveyors.

6. The apparatus of claim 5, wherein said first, second and third means for moving comprise means for guidingly driving the hand in three linear directions at substantially right angles to each other.

7. The apparatus of claim 6, including a main frame member for carrying said means for guidingly driving, wherein said means for guidingly driving include three separate cylinder means, each mounted relative to said frame member for guidingly driving in one of said three linear directions.

8. The apparatus of claim 7, wherein one of said cylinder means is generally horizontally disposed, mounted between the hand and a vertically movable plate, for moving the hand longitudinally of the path of strip movement; wherein another of said cylinder means is generally vertically disposed and mounted between said vertically movable plate and a frame-carried traversing plate for moving the vertically movable plate vertically, between conveyors; and wherein the remaining one of said cylinder means is generally horizontally disposed and mounted between said traversing plate and said main frame for moving the traversing plate generally transversely of the path of strip movement.

9. The apparatus of claim 3, wherein said means for maintaining the strips against the surface of the second conveyor comprise a roller disposed for transverse positioning across the input end of the second conveyor, and means mounting the roller for movement toward and away from said second conveyor for pressing the strips against said second conveyor and return therefrom.

10. The apparatus of claim 9, wherein a main frame is provided and wherein said means for maintaining the roller comprises a cylinder means mounted on a main frame for guidingly driving the movement of the roller toward and away from said second conveyor.

11. The apparatus of any of claims 3 through 10, wherein the strips being transferred comprise a tacky substance that creates a tacky resistance to separation from each of the board and blade, and wherein at least selected ones of said means for moving the hand and means for maintaining the strips include means providing a component of force sufficient to overcome the tacky resistance.

* * * * *